May 25, 1965  H. BROZIAT  3,185,876
APPARATUS FOR BRAKING OR SWITCHING OFF ELECTRIC MOTORS
Filed Nov. 1, 1961
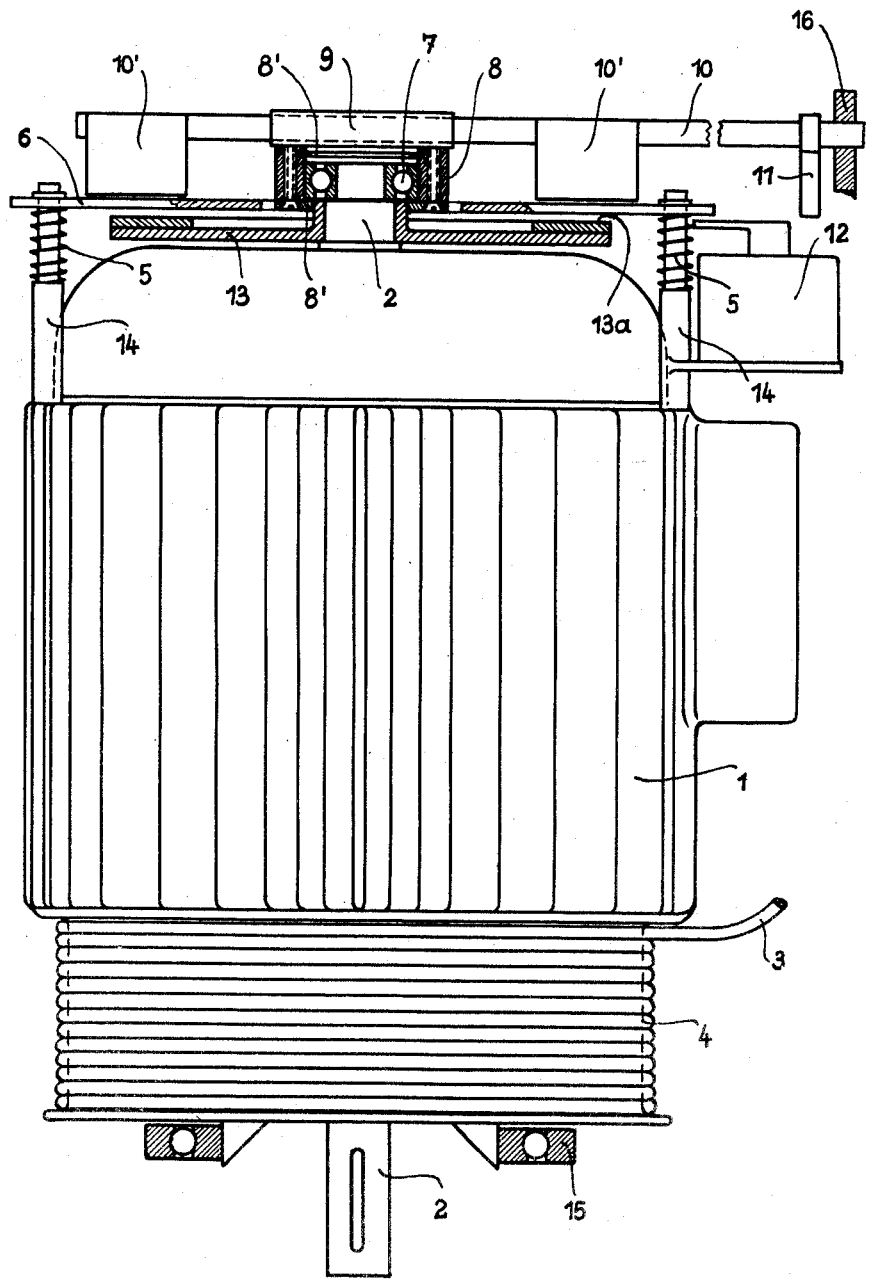

United States Patent Office 3,185,876
Patented May 25, 1965

3,185,876
APPARATUS FOR BRAKING OR SWITCHING OFF ELECTRIC MOTORS
Horst Broziat, 44 Radolfzeller Strasse,
Allensbach (Bodensee), Germany
Filed Nov. 1, 1961, Ser. No. 149,237
Claims priority, application Germany, Nov. 8, 1960,
B 60,019
2 Claims. (Cl. 310—77)

The present invention concerns an apparatus for switching off and braking electric motors, more especially for driving hawser winches and cable hoists, the rotatably mounted housing of which is connected to a driving shaft via a slip clutch.

It is often necessary in the case of mechanically operated devices to prevent the driving shaft from running down after the motor has been switched off but necessary to brake it. This is the case e.g. in respect of electric lawn mowers, in which the running down time of the cutter shaft amounts to about 2 minutes thus giving rise to accidents.

In such apparatus with mobile electric motors it has been proposed to bring about the constant automatic winding up of the connecting cable by the fact that the motor housing provided with a cable drum is also rotatably mounted and connected with the driving shaft of the motor via a brake producing a slip. In this case braking of the motor housing must take place simultaneously with the driving shaft.

Known embodiments using displacing and brake armature motors and also magnetically actuated brake devices are comparatively complicated for small appliances and costly, above all they do not permit the additional braking of the housing.

According to the present invention the auxiliary apparatus is characterised in that a brake disc is arranged on one end of driving shaft against which brake disc a thrust disc, spring mounted on the motor housing, is adapted to be pressed by means of a cam shaft provided with an operating handle, the cams simultaneously actuating a cut-out switch, the cam shaft being mounted adjacent to the brake disc on the motor shaft in a fixed bearing collar arrangement.

The invention provides a simple and cheap solution, and the auxiliary apparatus can, if necessary be subsequently fitted to an existing machine.

The bearing collar for the cam shaft may be mounted on a ball bearing of the motor shaft by means of a two-part holding ring adapted to receive the braking forces acting in an axial direction; the cam shaft may be clamped at one end.

The invention will be described further, by way of example, with reference to the accompanying drawing, in which the single figure is a side elevation, partly in section of an electric motor constructed in accordance with the invention. The electric motor illustrated is intended, for example, for a lawn mower; it carries on the lower end of its driving shaft 2 a working implement, in the example the mowing cutters (not shown). The motor is also intended for constantly and automatically winding up and tensioning its connecting cable 3, which is wound on to the lower portion of the motor housing 1 formed as a cable drum 4. For this purpose the motor housing 1 is mounted on ball bearings 15 so that it is also rotatable and connected to the driving shaft 2 via a brake (not shown) which produces a slip, e.g. air vanes, slip clutch, whereby in dependence upon the magnitude of slip a suitable portion of the overall torque transmitted by the motor shaft 2 is diverted for the rotation of the motor housing 1 and the winding device formed thereby.

The upper end of the driving shaft 2 carries a brake disc 13 having a brake lining 13a and, on an outer ball race of a ball bearing 7, a holding ring 8 for a bearing collar 9 connected rigidly therewith. The holding ring 8, for easier mounting, may be in two parts and is provided with shoulder rings and/or spring rings 8', which prevent axial displacement of the holding rings due to the braking thrust.

A thrust plate 6 arranged opposite the braking disc 13 is supported on compression springs 5 mounted on holding bolts 14 fixed in the motor housing 1. The thrust plate 6 is adapted to be pressed against the brake disc 13 by means of diametrically opposite cams 10' of a cam shaft 10 which is journalled at one end in a stationary bearing 16 and supported in the bearing collar 9, a handle 11 being provided for rotating the cam shaft 10. Thus, when the cam shaft 10 is rotated by the handle 11 about its longitudinal axis, the driving shaft 2 and the motor housing 1 are simultaneously braked. Moreover when the thrust plate 6 is depressed, a push-button switch 12 is simultaneously actuated thereby to switch off the current.

In the embodiment described the axial forces occurring during braking are absorbed in a simple manner.

I claim:
1. Apparatus for braking an electric motor in which both the motor housing and drive shaft rotate freely relative to each other, comprising a brake disc mounted on one end of said drive shaft, a thrust disc, spring mounted on said housing and means for selectively pressing said thrust disc into contact with said brake disc, said means for selectively pressing said thrust disc into contact with said brake disc comprising a plurality of cams mounted on a cam shaft having an operating handle, said cam shaft being mounted adjacent said brake disc in a bearing collar mounted on said drive shaft.

2. The apparatus according to claim 1, further comprising a ball bearing and a two part holding ring for mounting the cam shaft bearing collar to the drive shaft.

References Cited by the Examiner

UNITED STATES PATENTS

| 1,347,785 | 7/20 | Libby | 188—71 |
|---|---|---|---|
| 1,585,065 | 5/26 | Wilsing. | |
| 1,935,800 | 11/33 | Kingston | 310—68.1 |
| 2,247,795 | 7/41 | Whitcomb et al. | 310—67 |
| 2,487,395 | 11/49 | Strang | 310—67 |
| 2,528,489 | 11/50 | Bendnash et al. | 310—77 |
| 2,571,374 | 10/51 | Mayr | 310—115 |
| 2,578,837 | 12/51 | Raney | 310—77 |

MILTON O. HIRSHFIELD, *Primary Examiner.*

ORIS L. RADER, JOHN F. COUCH, *Examiners.*